Oct. 28, 1930.  E. S. MacPHERSON  1,779,912
LUBRICATING SYSTEM
Filed Sept. 29, 1924   3 Sheets-Sheet 3
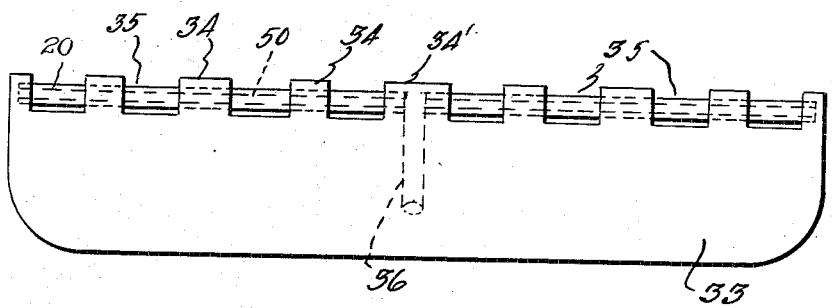
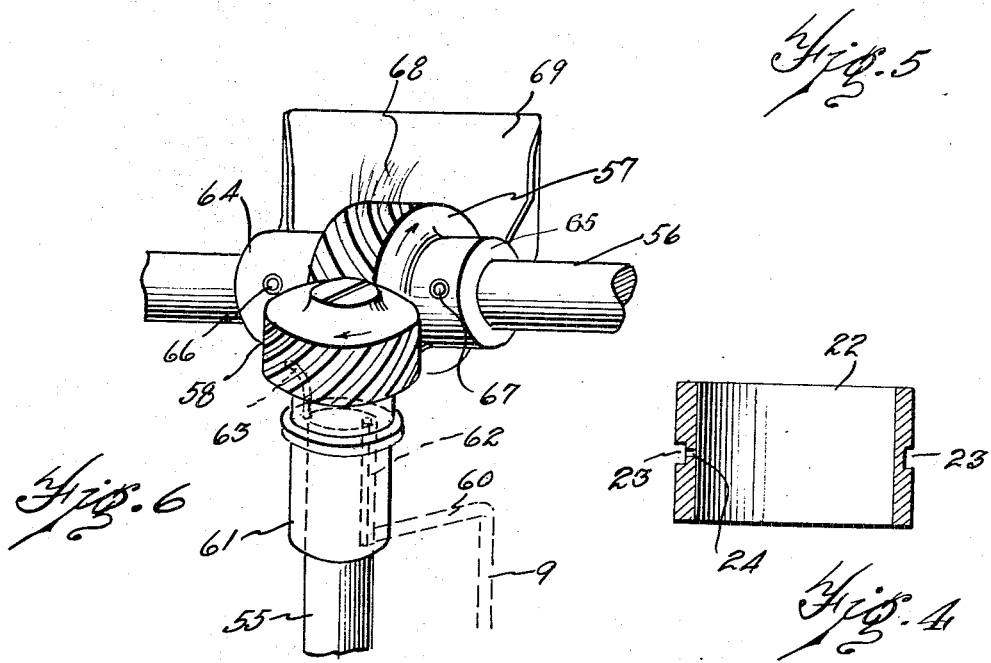
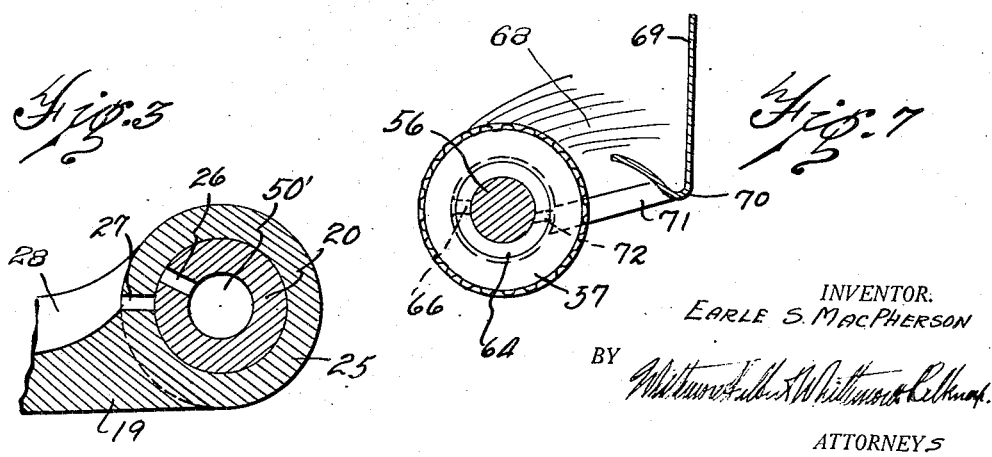
INVENTOR.
EARLE S. MacPHERSON
ATTORNEYS Patented Oct. 28, 1930

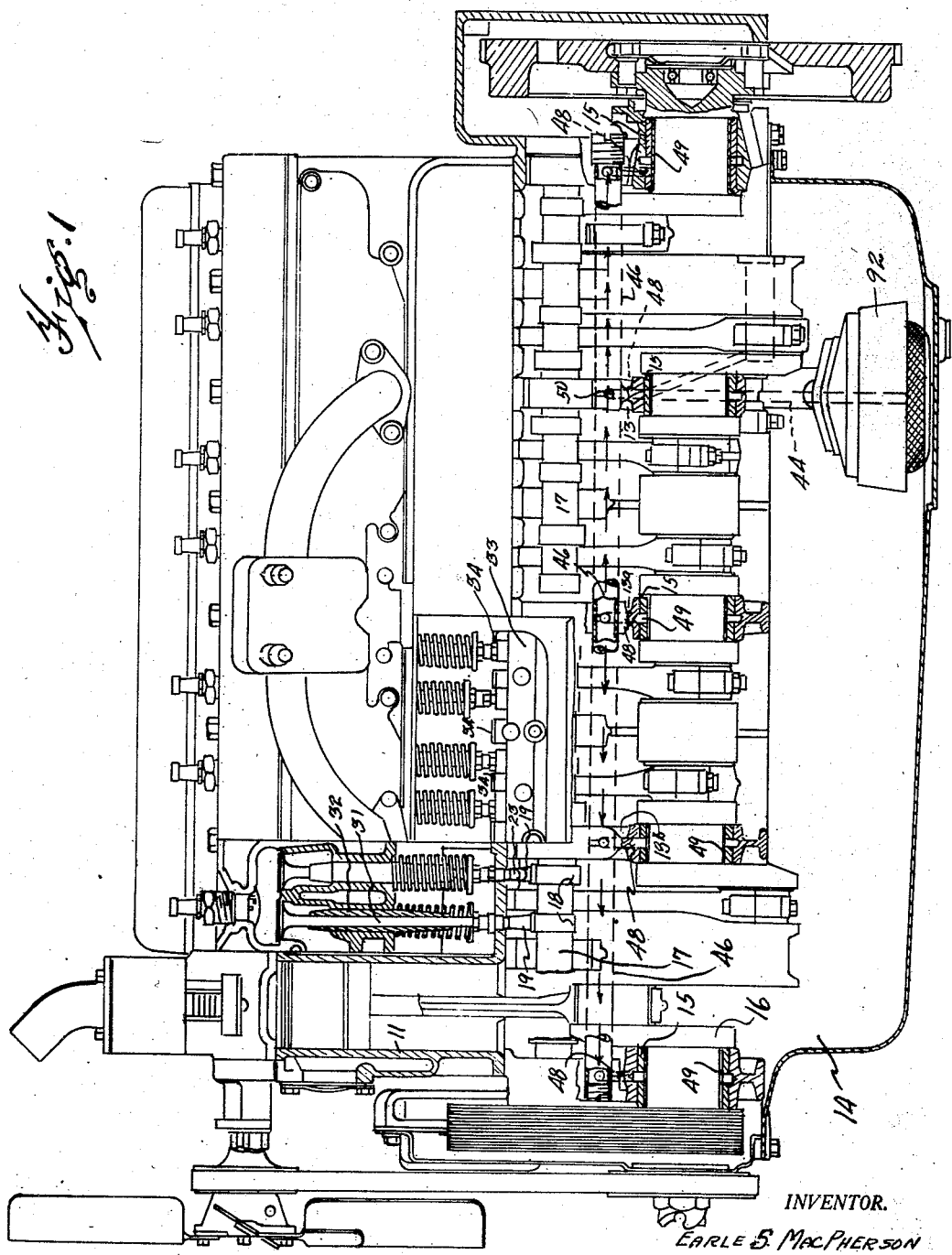

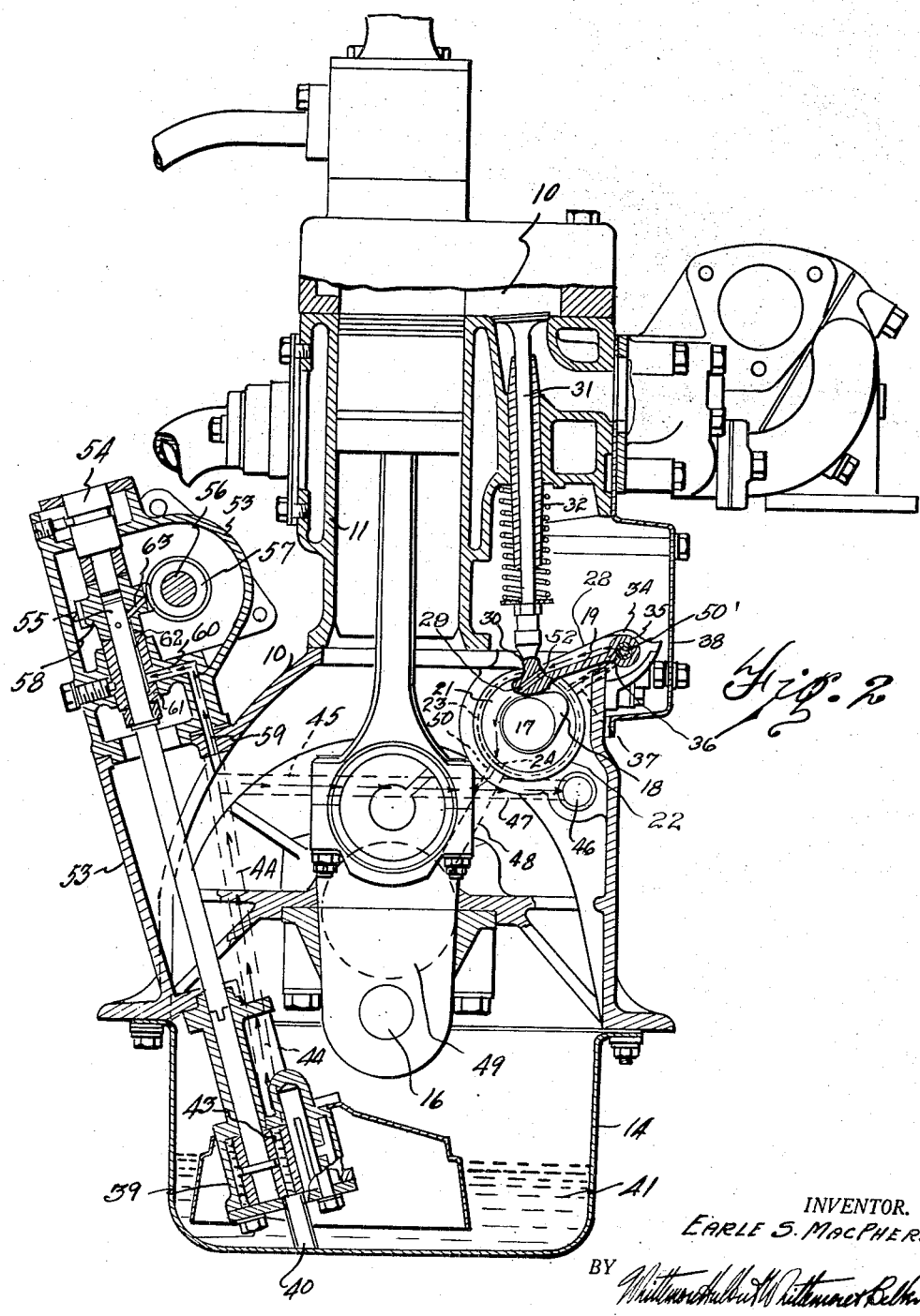

1,779,912

UNITED STATES PATENT OFFICE

EARLE S. MacPHERSON, OF DETROIT, MICHIGAN, ASSIGNOR TO HUPP MOTOR CAR CORPORATION, OF DETROIT, MICHIGAN, A CORPORATION OF VIRGINIA

LUBRICATING SYSTEM

Application filed September 29, 1924. Serial No. 740,577.

The invention relates to engine lubricating systems and has for one of its objects to provide means for effectively lubricating an engine. Another object resides in a lubrication system for an internal combustion engine of the type having a plurality of aligned cylinders. A further object is to provide means for lubricating the cam shaft bearings and cam surfaces, the timing and pump shaft bearings and other bearings of the engine.

With these and other objects in view, the invention resides in the novel features of construction and combinations and arrangements of parts as more fully hereinafter described and claimed.

Referring to the drawings which are made a part hereof and in which similar reference characters indicate corresponding parts:

Figure 1 is a side elevation of an internal combustion engine, partly in section, showing the oil passages in dotted lines;

Figure 2 is a section along the line 2—2 of Figure 1;

Figure 3 is a sectional fragmentary view through the bearing of one of the valve rocker arms;

Figure 4 is a sectional view showing a bushing for the cam shaft bearing;

Figure 5 is an elevation showing one of the brackets for the hollow shafts;

Figure 6 is a detail view of the lubrication means for the pump shaft gears and bearings, and Figure 7 is a view along the line 7—7 of Figure 6.

Referring to the drawings, reference character 10 indicates the cylinder block, eight aligned cylinders 11 being provided in this instance. A plurality of webs 13, 13ª and 13ᵇ are provided, extending transversely of the crank case 14 and providing bearings 15 for crank shaft 16. A cam shaft 17 extends longitudinally of the engine block and is provided with a plurality of cams 18 spaced for engagement with valve rock arms or members 19. These rock arms are formed with bearing portions 25 adapted to have rocking support on a hollow shaft 20 as shown particularly in Figure 3. The cam shaft 17 is provided with bearings 21 formed in the webs 13. These bearings are provided with bushings 22 formed with a peripheral oil channel 23 and a transverse or radial oil passage 24 as shown particularly in Figure 4. The hollow shaft 20 is provided with a radial oil passage 26 and the bearing portion 25 of each rock arm is provided with an oil passage 27 preferably not registering with passage 26 when the rock arm is in its lower position but adapted to register therewith when the rock arm is raised by the cam 18. The upper face of each of the rock arms 19 may be trough shaped as indicated at 28, the lower ends of the rock arms terminating in a cam face 29 and a head 30, the latter adapted to engage valve stems 31 whereby the valve stems are reciprocated in the bearings 32.

The hollow shafts 20 are supported in a pair of brackets 33 preferably longitudinally aligned and extending forwardly and rearwardly respectively from the mid point of the engine block. Figure 5 represents a detail view of one of the brackets and in Figure 1 the forwardly extending bracket is shown. The brackets 33 are provided with bearings 34 for a shaft 20, the spaces 35 between the bearings accommodating the rock arms 19. A separate hollow shaft 20 is preferably provided for each bracket and as shown in Figure 5 each shaft is divided into two parts spaced apart within the center bearing 34'. An oil passage 36 communicates with the space between the shaft ends and also with oil passage 37 in the webs 13 and 13ᵇ located at the mid points of the brackets 33. The lower end of passage 37 communicates with the channel 23 or bushing 22. A casing 38 preferably encloses the rock arms and valve stems as shown in Figure 2.

In operation for supplying oil to the valve stems, rock arms, and other parts of the engine, a pump 39 is located in the crank case 14 forming a reservoir for lubricating oil 41. The pump 39 is provided with inlet 40, preferably located beneath bell 42 extending below the surface of the oil, and outlet 43 communicating with oil supply passage 44 preferably located in the web 13. Extending horizontally from the passage 44 is a passage 45 for supplying oil to the header 46 extending longitudinally of the engine cylinders. All of the webs are provided with a horizontally extending oil passage 47 for conducting oil from header 46 through passages 48 to the main bearings 49 of the crank shaft 16. The webs are also provided with upwardly extending passages 50 for supplying oil to channels 23 of bushings 22 and thence through passage 24 to lubricate cam shaft bearings 21, the oil also passing around the channels 23 and through passages 31 and 36 dividing within bearing 34' and flowing in opposite directions along passages 50 of the hollow shafts 20. From the hollow shafts the oil is supplied intermittently through the passages 26 and 27, the oil flowing therethrough preferably when the rock arms 19 are raised by cams 18 giving the bearing portions 25 a rotary movement on the shafts 20 whereby passages 26 and 27 are aligned. The oil from passages 27 is received in the troughs 28 and is fed downwardly by gravity to a passage 52 extending through head 30. Oil escaping from passage 52 lubricates the face of cam 18 and surface 29, the cam preferably rotating clockwise as viewed in Figure 2. Because of the reciprocations of the rock arms 19 a portion of the oil being conveyed downwardly along troughs 28, is splashed upwardly forming an oil spray which strikes the contacting surfaces of the head 30 and valve stem 31 and also serves to lubricate the valve stem 31 within bearing 32. The spray is confined by casing 38, the drip passing with the oil from the face of cams 18 back to the crank case 14.

Secured to the main cylinder block 10 is a frame 53, the upper end of which carries a timer 54 actuated by a shaft 55. The shaft 55 is driven from shaft 56 through helical gears 57, 58. The lower end of shaft 55 operates the pump 39. Shaft 56 may be rotated through suitable chain or gear connection with the main crank shaft (not shown).

The oil supply passage 44 is provided with an extension 59 projecting upwardly into the frame 53 and having an oil passage 60 extending through a bearing 61 for shaft 55. This bearing is provided with a longitudinally extending oil groove 62, the upper end of which communicates with an oil passage of which communicates with an oil passage 63 projecting radially through the gear 58 whereby oil is conducted from the groove 62 through the gear 58 and ejected from its periphery as the gear rotates. The relation of shafts 56 and 55 carrying gears 57 and 58 respectively is shown particularly in Figure 6. Shaft 56 is provided with the bearing 64 located to the left of gear 57 as viewed in Figure 6, and at the right with the bearing 65. Bearings 64 and 65 are respectively provided with oil conducting passages 66 and 67 having their openings positioned to receive the oil discharged from passage 63 as the gear 58 is rotated by gear 57 in the directions indicated by the arrows in Figure 6.

As the gears rotate, lubricating oil will be ejected from passage 63 and will be received intermittently by the passages 66 and 67 to lubricate the bearing surface of the shaft 56 with the bearings 64 and 65. Oil will also be discharged on the face of gear 57 thus reducing the frictional resistance of contact of the gears and effectively lubricating these parts.

Instead of having passage 63 extending from the gear 58 as shown in Figure 6, it is obvious that the passage could be extended through shafts 55 and directed to impinge upon the gear 57 and bearings 64 and 65 as shaft 55 rotates.

In actual practice I have found that the oil tends to collect along the right edge of the geared face of gear 57 the oil running over this edge radially inwardly between the side face of gear 57 and bearing 65 to the shaft 56 thus further facilitating lubrication of the shaft in the bearing 65. Preferably the lubrication of bearing 64 is also supplemented by a device shown particularly in Figure 7. As gear 57 rotates oil will be thrown by centrifugal force radially outwardly in a spray as indicated at 68. This spray is collected by a pan 69 having a gutter 70 provided with a downwardly extending passage 71 leading through bearing 64 by a passage indicated at 72 to the shaft 56.

The term oil throughout the specification and claims denotes any suitable lubricating medium capable of flowing through the various passages.

While it is believed that from the foregoing description, the nature and advantages of my invention will be readily understood, I desire to have it understood that I do not limit myself to what is herein shown and described and that such changes may be resorted to when desired as fall within the scope of what is claimed.

What I claim as my invention is:

1. In an engine having a plurality of webs, a source of lubricant, a cam shaft extending longitudinally of the engine, a plurality of cams on said cam shaft, a plurality of arms actuated by said cams, said webs provided with lubricant conducting passages communicating with said source of lubricant, means for conducting said lubricant from said passages to said arms, and means for conducting the lubricant from the arms to the faces of the cams.

2. In an engine having a plurality of webs, a source of lubricant, a cam shaft extending longitudinally of the engine, a plurality of cams on said cam shaft, a plurality of arms actuated by said cams, said webs provided with lubricant conducting passages communicating with said source of lubricant, means for conducting said lubricant from said passages to said arms, means for conducting the lubricant from the arms to the faces of the cams, a plurality of valve stems and bearings therefor, said valve stems operated by contact with said arms, said last named means being also adapted to direct the lubricant from the arms to the said valve stem bearings and to the point of contact between the arms and the valve stems.

3. In an engine having a crank case for containing lubricating oil and a plurality of webs, a header extending longitudinally of the engine, a plurality of crank shaft bearings carried by the webs, a cam shaft, bearings therefor, a plurality of rock arms operated by the cams, valve stems contacting with said arms, bearings for the valve stems, said webs provided with passages for supplying oil to the header from the crank case and other passages for supplying oil from the header to the crank shaft and cam shaft bearings, means for conducting oil from the latter bearings to said arms, and means for conducting oil from said arms to the cam faces, valve stem bearings and the contact with said arms and valve stems.

4. In an engine having a cam shaft, a cam on said shaft, a bracket provided with spaced bearing portions, a hollow shaft supported by the bearing portions of the bracket, a rock arm pivotally mounted on the hollow shaft between said spaced bearing portions and contacting with the cam, a web having a lubricant passage communicating with a source of supply, means for conducting lubricant from the passage in said web through the said bracket to said hollow shaft, means for conducting lubricant from said hollow shaft to said arm, and means for conducting lubricant from the arm to the face of the cam.

5. In an engine having a plurality of webs, a cam shaft journaled in said webs, a plurality of cams on said shaft, a pair of brackets, a hollow shaft within each bracket comprising a pair of spaced sections, communicating oil passages in said brackets and webs for conducting oil from a source of supply to a point between the said sections of the hollow shaft for distribution along the hollowed portions of the shaft, a plurality of arms pivotally mounted on the hollow shaft and contacting with said cams, and means for conducting oil from the sections of the hollow shaft to the arms and thence to the faces of said cams.

6. In an engine having a cam, a valve stem, an arm between said cam and stem, a bearing for said stem, means for conducting oil to said arm and means responsive to the movement of the arm for spraying oil on the valve stem bearing.

7. In an engine, a shaft, a gear on the shaft, a second shaft, a gear on the latter shaft meshing with the gear on the former, a bearing for the first said shaft adjacent its gear, means for conducting oil axially of the second shaft, said second gear having a radial passage communicating with the axial oil conducting means for ejecting oil radially of the second gear whereby as the second shaft rotates oil ejected from the said second gear will impinge upon the gear of the first shaft and the bearing thereof.

8. In a mechanism, a pair of shafts, gears carried by the shafts for transferring movement through the shafts, means for supplying lubricating oil under pressure to one shaft, means for conveying the oil to the gear of the other shaft, a bearing for one of the shafts, and means for collecting the oil from the gear and conducting it to the said bearing.

9. In an engine, a shaft, a gear thereon, bearings for the shaft at opposite sides of the gear, said bearings having radial oil conducting passages, a second shaft, a gear for the latter shaft meshing with the first said gear, means for supplying oil under pressure axially of the second said shaft and radially to impinge upon the gear of the first said shaft and to impinge upon the oil passages of the said bearings.

10. In an engine, a shaft, a gear thereon, bearings for the shaft at opposite sides of the gear, said bearings having radial oil conducting passages, a second shaft, a gear for the latter shaft meshing with the first said gear, means for supplying oil under pressure axially of the second said shaft and radially to impinge upon the gear of the first said shaft and the oil passages of the said bearings, and means for collecting oil from the latter gear and conveying it to one of the bearings.

11. In an engine having a crank case, cam shaft and valves, a plurality of webs providing bearings for said crank shaft and cam shaft, a supply of lubricating oil contained within the crank case, a pump, gearing for actuating said pump, one of said webs having an oil conducting passage for conducting oil from said supply for distribution to said gears, a header extending longitudinally of the engine, said last named web also having a passage for conducting oil from the first said passage to the header, and means provided by each of said webs for conducting oil from the header to the connecting rod and cam shaft bearing provided by the respective webs.

12. In an engine having a crank case, a cam shaft, and valves, a plurality of webs providing bearings for said crank shaft and cam shaft, a supply of lubricating oil contained within the crank case, a pump, gearing for actuating said pump, one of said webs having oil conducting passage for conducting oil from said supply for distribution to said gears, a header extending longitudinally of the engine, said last named web also having a passage for conducting oil from the first said passage to the header and means provided by each of said webs for conducting oil from the header to the connecting rod and cam shaft bearing provided by the respective webs, valve stems adapted to actuate said valves, cams carried by said cam shaft, actuating members between said cams and valve stems respectively, and means for conducting oil from the said cam shaft bearings to the respective actuating members for lubricating the engaging surfaces of the cams and actuating members.

13. In an engine having a crank case, cam shaft and valves, a plurality of webs providing bearings for said crank shaft and cam shaft, a supply of lubricating oil contained within the crank case, a pump, gearing for actuating said pump, one of said webs having an oil conducting passage for conducting oil from said supply for distribution to said gears, a header extending longitudinally of the engine, said last named web also having a passage for conducting oil from the first said passage to the header, and means provided by each of said webs for conducting oil from the header to the connecting rod and cam shaft bearing provided by the respective webs, and also for lubricating the engaging surfaces of the actuating members and valve stems.

14. The combination in a lubricating system for an internal combustion engine, of a web, a cam shaft, a valve, a hollow shaft adjacent said cam shaft, a rock arm pivotally mounted on said hollow shaft and contacting with said cam and said valve for actuating the latter, a source of lubricant, and means for circulating the said lubricant through said web to said cam shaft, and from said cam shaft to said hollow shaft for lubricating said cam and said rock arm.

15. The combination in a lubricating system for an internal combustion engine, of a web, a cam shaft, cams on said cam shaft, a plurality of valves, a bracket, a hollow shaft supported by said bracket, a plurality of rock arms pivotally mounted on said hollow shaft and contacting with said cams and valves for actuating the latter, a source of lubricant supply and means for circulating the lubricant through said web to said cam shaft, from said cam shaft to said bracket and through said bracket to the hollow shaft for lubricating the said cams and rock arms.

16. The combination in a lubricating system for an internal combustion engine, of a web, a cam shaft, cams on said cam shaft, a plurality of valves, a bracket, a pair of hollow shafts supported in said bracket, rock arms pivotally mounted on said hollow shafts and contacting with the cams and valves for actuating the latter, a source of lubricant supply, and means for circulating the lubricant through said web to said cam shaft, from said cam shaft to said bracket, and through said bracket to each of said hollow shafts, for lubricating the said cams and rocker arms.

17. In combination, a driving gear and a gear to be driven, a bearing for the driven gear, means for supplying lubricant under pressure to the driving gear, means for conveying the lubricant from the driving gear to the driven gear, a pan arranged to receive the lubricant sprayed outwardly from the driven gear by centrifugal force, a gutter in the said pan and a conduit for conducting the lubricant from the gutter to the said bearing.

In testimony whereof I affix my signature.
EARLE S. MacPHERSON.